United States Patent [19]
Ito

[11] 3,813,948
[45] June 4, 1974

[54] APPARATUS FOR DETECTING UNBALANCE IN A WHEEL

[75] Inventor: Jinichi Ito, Tokyo, Japan

[73] Assignee: Yamada Yuki Seizo Co., Ltd., Sagamihara City Kanagawa Pref., Japan

[22] Filed: Aug. 9, 1972

[21] Appl. No.: 279,229

[52] U.S. Cl. .................................. 73/460, 73/475
[51] Int. Cl. .......................................... G01m 1/16
[58] Field of Search ............ 73/460, 462, 468, 469, 73/471–479, 459

[56] References Cited
UNITED STATES PATENTS
| | | | |
|---|---|---|---|
| 2,127,950 | 8/1938 | Bennett | 73/474 |
| 2,442,308 | 5/1948 | Meredith et al. | 73/471 |
| 3,289,483 | 12/1966 | Slemmons | 73/459 |

FOREIGN PATENTS OR APPLICATIONS
| | | | |
|---|---|---|---|
| 1,192,221 | 5/1970 | Great Britain | 73/460 |
| 738,861 | 10/1955 | Great Britain | 73/468 |

Primary Examiner—James J. Gill
Attorney, Agent, or Firm—Stevens, Davis, Miller & Mosher

[57] ABSTRACT

This invention relates to an apparatus for detecting unbalance in a wheel.

Said apparatus comprises a rotary shaft adapted to vibrate radially thereof, said rotary shaft mounting thereon a wheel to be tested for unbalance, and means for supporting said rotary shaft such that the instantaneous center of vibration of the rotary shaft can be set at a side surface of the wheel to which an adjusting weight is to be attached.

10 Claims, 40 Drawing Figures

(a)

(b)

FIG. 4
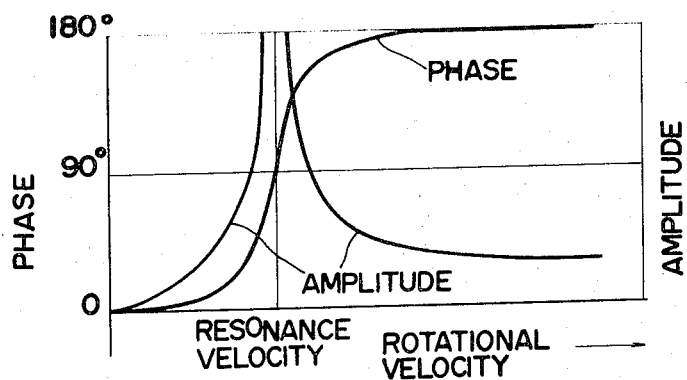
FIG. 5(a)    FIG. 5(b)    FIG. 5(c)
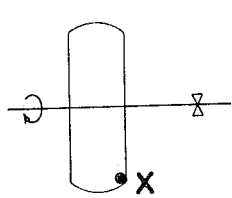 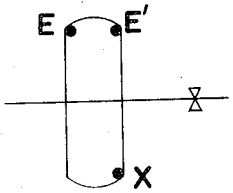 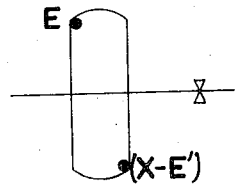
FIG. 5(d)    FIG. 5(e)
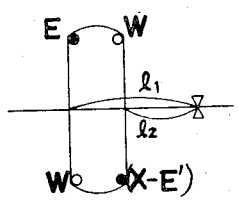 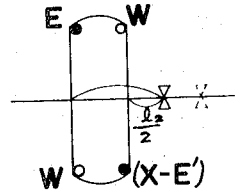

APPARATUS FOR DETECTING UNBALANCE IN A WHEEL

This invention relates to an apparatus for quickly and positively detecting unbalance in a wheel of a motor vehicle and restoring balance thereto.

Marked advances in the development of construction of speedways have in recent years brought about an increase in the speed of motor vehicles. Balancing of wheels of a motor vehicle has become increasingly important as the speed of the motor vehicle increases. It is impossible to drive normally a motor vehicle whose wheels are unbalanced when the vehicle is run at high speed even if it has perfect wheel alignment.

That is, if the motor vehicle has static unbalance, it will vigorously vibrate vertically and tire the driver and occupants. If it has dynamic unbalance, it will oscillate transversely about the king pin and result in abnormal wear of the tire or abnormal vibration of the steering wheel, thereby bringing about a dangerous situation.

Nowadays, motor vehicles are designed such that their bodies are light in weight and sturdy in construction in order that they can attain a better performance. Thus, each body is now a vibration system which has a sharper inherent resonance frequency than bodies of the prior art, so that it can be compared to a resonator. An unbalanced wheel can be compared to a vibrator which produces a vibration of a frequency corresponding to the speed of the motor vehicle.

It will thus be evident that it is essential for a motor vehicle that its wheels should be balanced if it is to be driven safely and comfortably at high speed. Thus, many proposals have hitherto been made to detect unbalance in wheels and restore balance thereto, but none of them have been able to achieve satisfactory results because of the facts that some of them are hard to handle, some are time consuming in carrying out detection and some are incapable of producing accurate values in detecting unbalance in wheels.

The present invention obviates the aforementioned disadvantages of the prior art. Accordingly an object of the invention is to provide an improved apparatus for detecting unbalance in a wheel.

Another object of the invention is to provide an apparatus which permits readily shifting the instantaneous center of vibration of the vibration system.

Another object of the invention is to provide an apparatus which permits readily setting the instantaneous center of vibration of the vibration system at points on opposite sides of a wheel.

Another object of the invention is to provide an apparatus for detecting unbalance in a wheel which is simple in construction and easy to operate.

Still another object of the invention is to provide an apparatus which is reliable in detecting the phase of unbalance in a wheel.

Still another object of the invention is to provide an apparatus for detecting unbalance in a wheel which permits displacement of the center axis of the rotary shaft to be corrected.

A further object of the invention is to provide an apparatus which permits the amount of unbalance in a wheel to be determined with increased accuracy.

Additional and other objects as well as features and advantages of the invention will become evident from the description set forth hereinafter when considered in conjunction with the accompanying drawings, in which:

FIGS. 1(a), 1(b), 1(c), 1(d), and 1(e) explain that if unbalance of a wheel is corrected with respect to opposite sides thereof, the wheel as a whole can be balanced;

FIGS. 2(a) and 2(b) are views in explanation of the essence of the principles on which apparatus for detecting unbalance in a wheel are based;

FIG. 4 is a graph showing the relation between the speed of revolution of a wheel and its amplitude;

Figure 2:
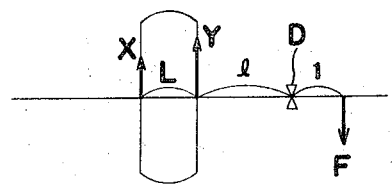
Figure 2:
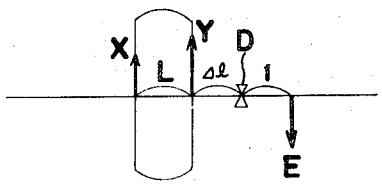
Figure 6:
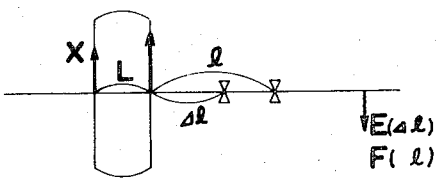
Figure 7:
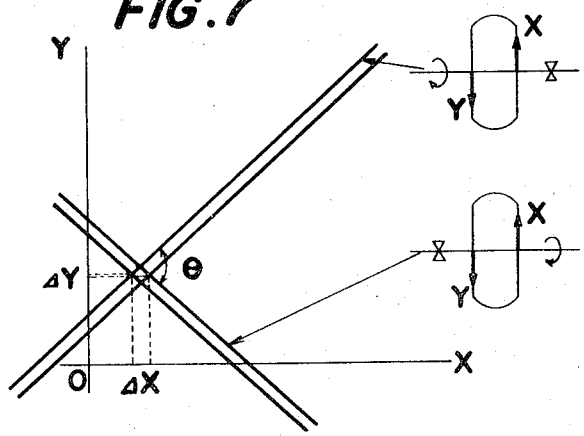
Figure 8:
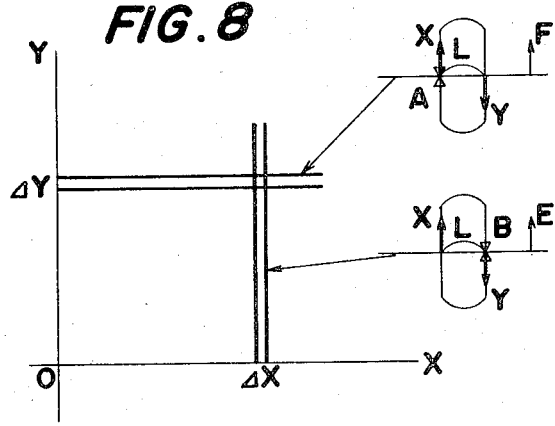
Figure 9:
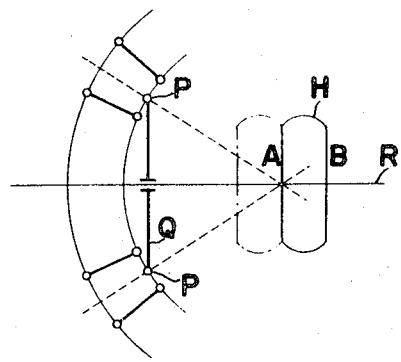
Figure 11:
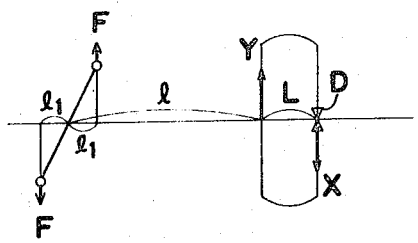
Figure 9:
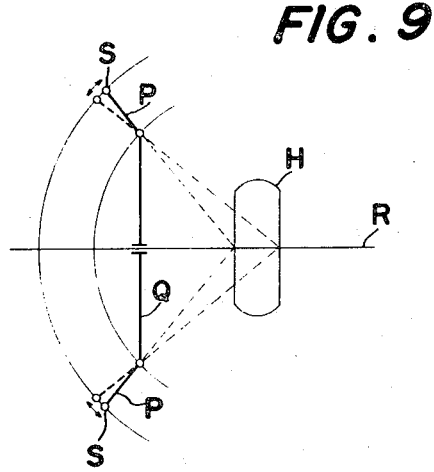
Figure 11:
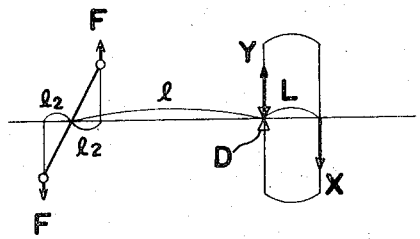
Figure 10:
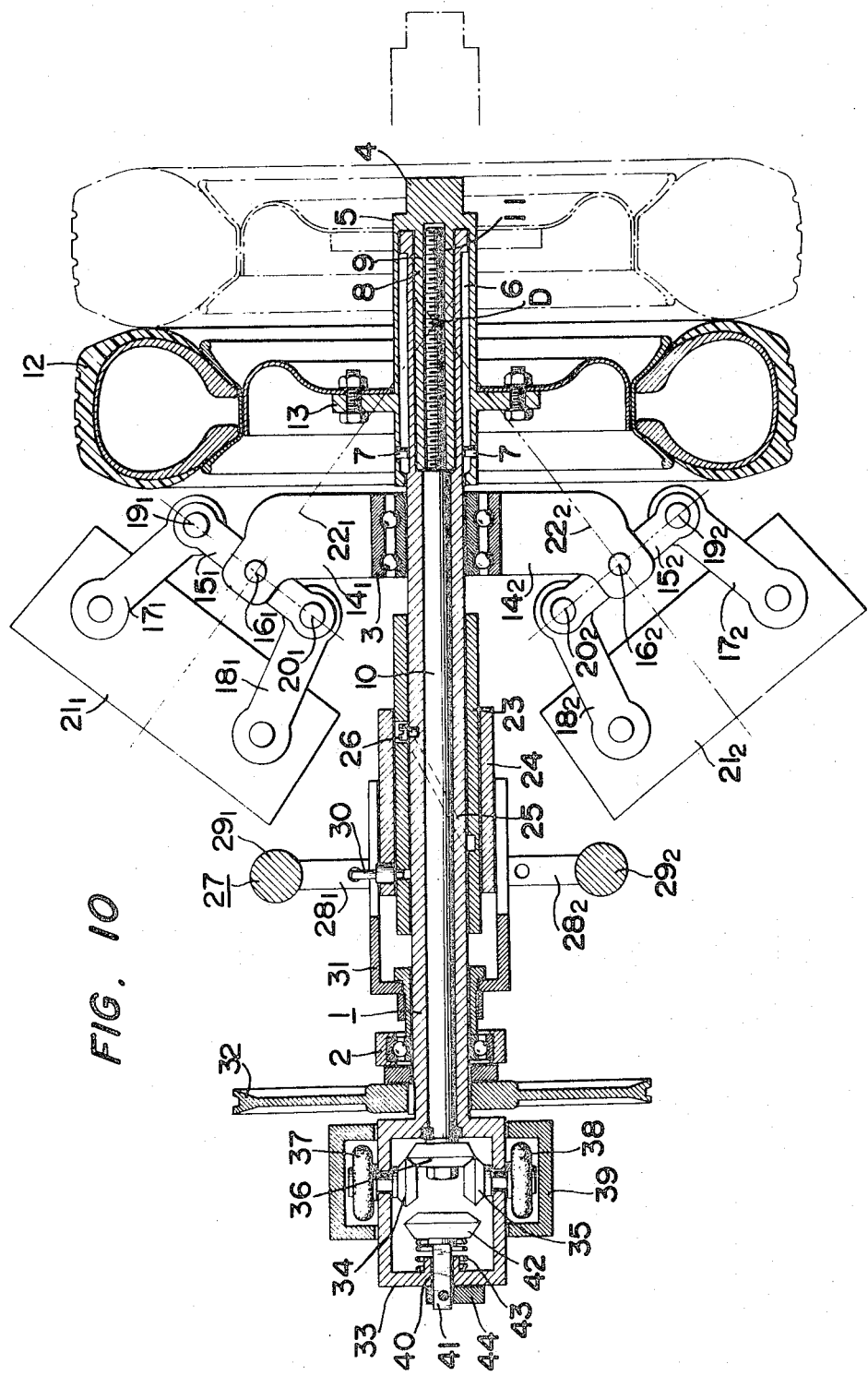
Figure 12:
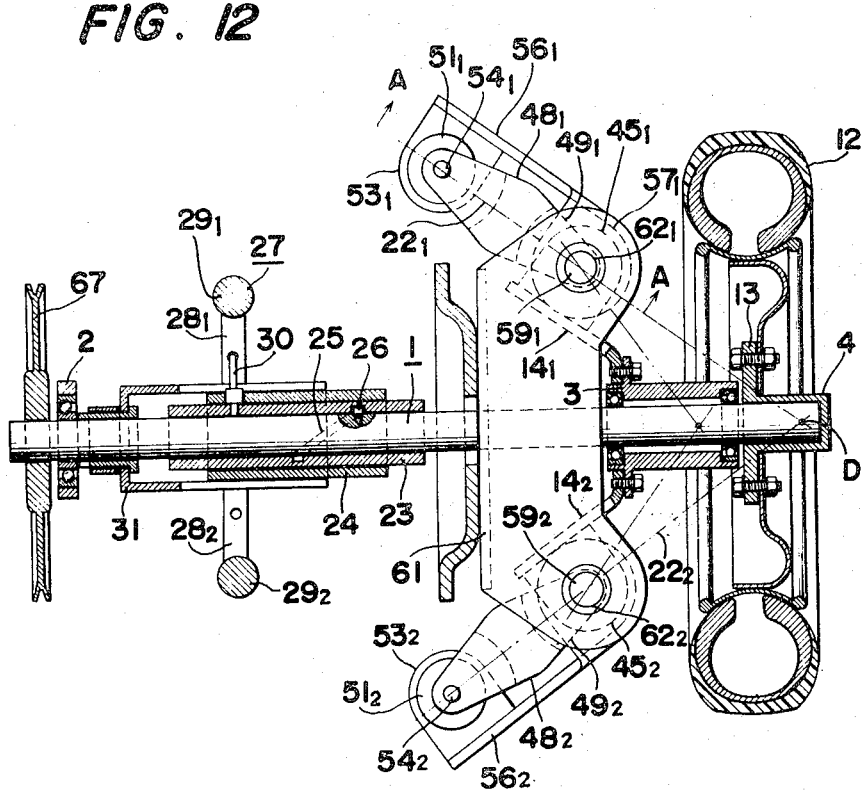
Figure 13:
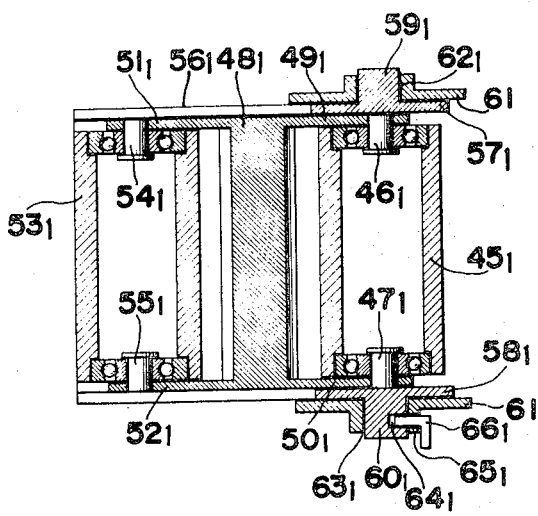
Figure 14:
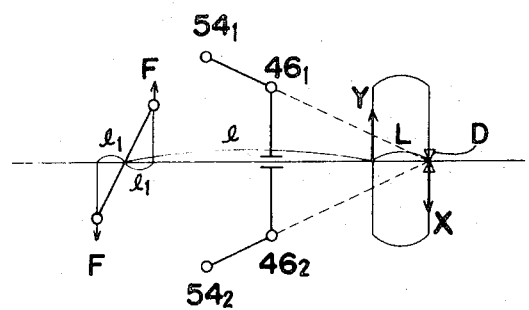
Figure 14:
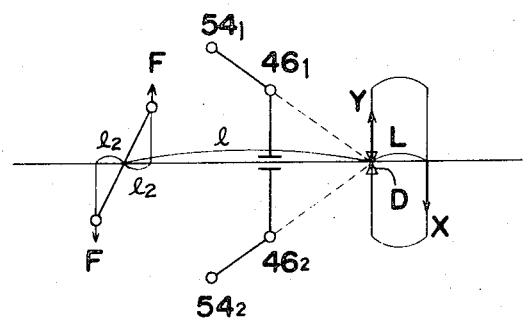
Figure 15:
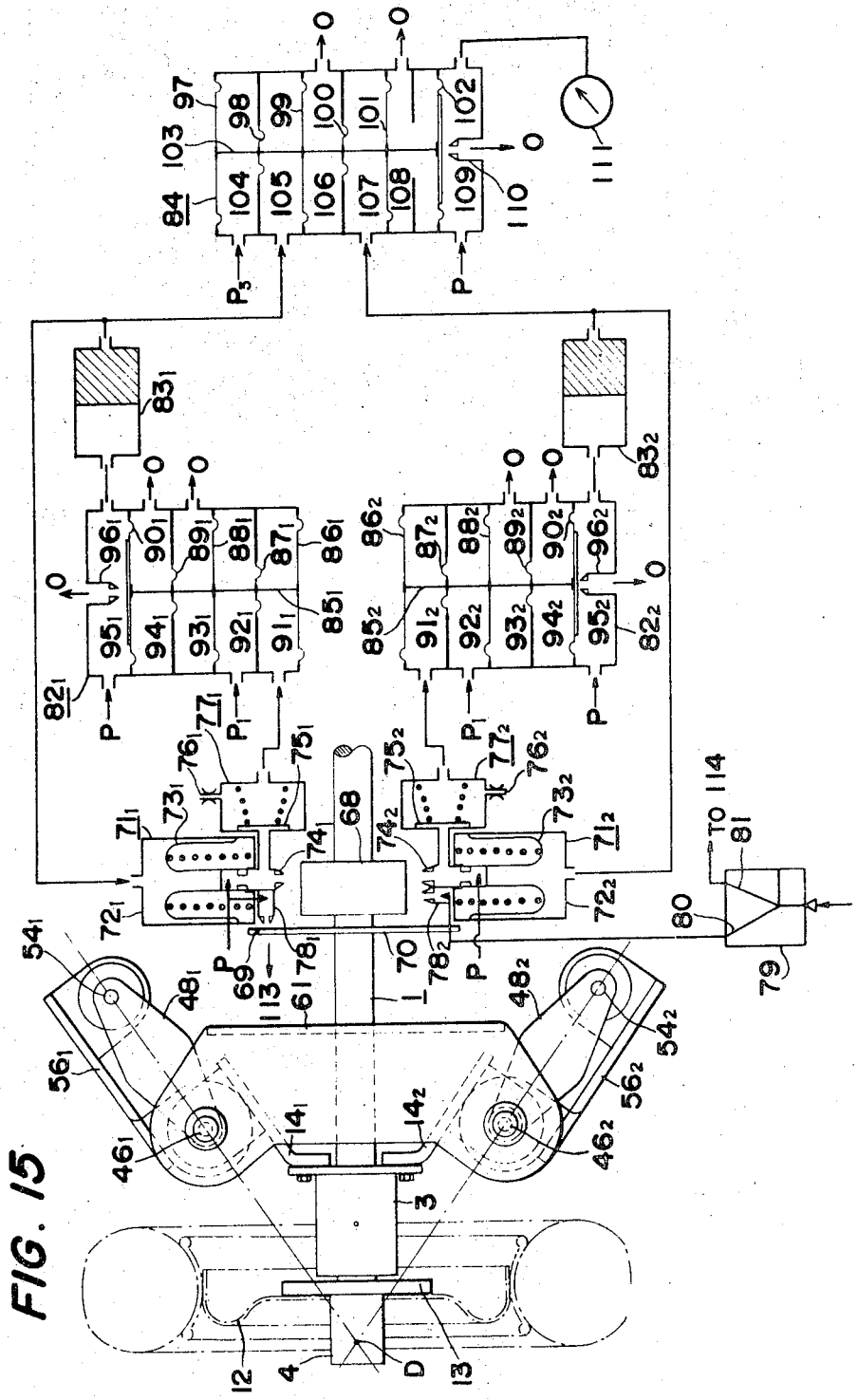
Figure 16:
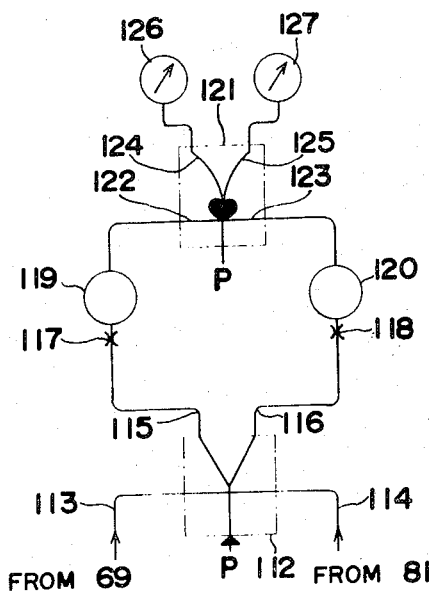
Figure 17:
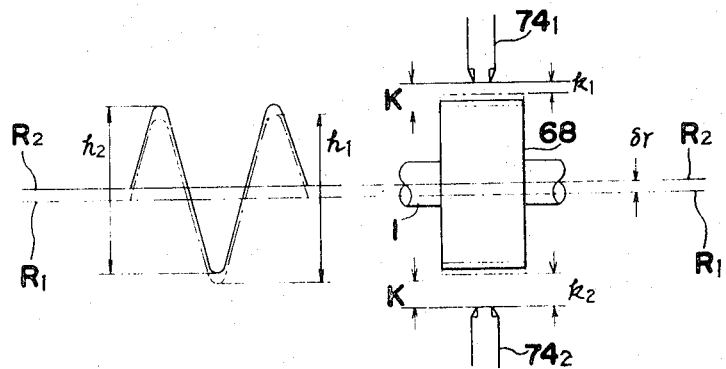
Figure 18:
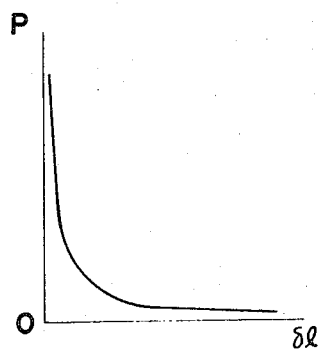
Figure 19:
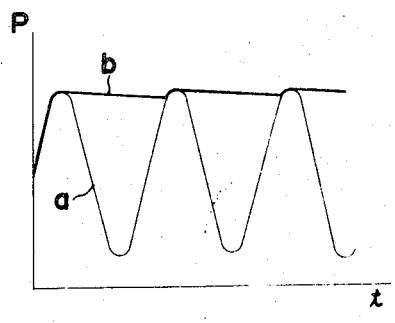
Figure 20:
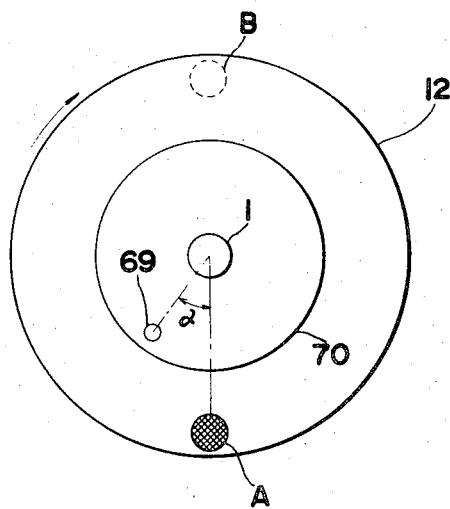
Figure 21:
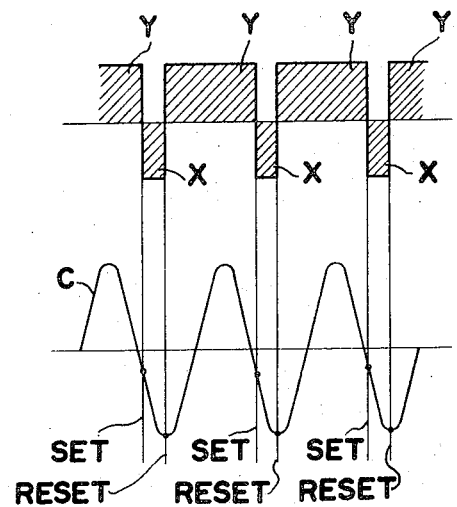
Figure 22:
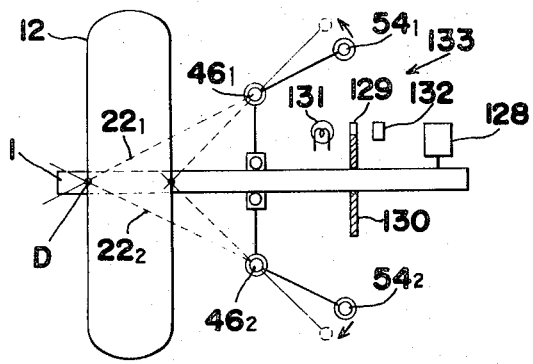
Figure 23:
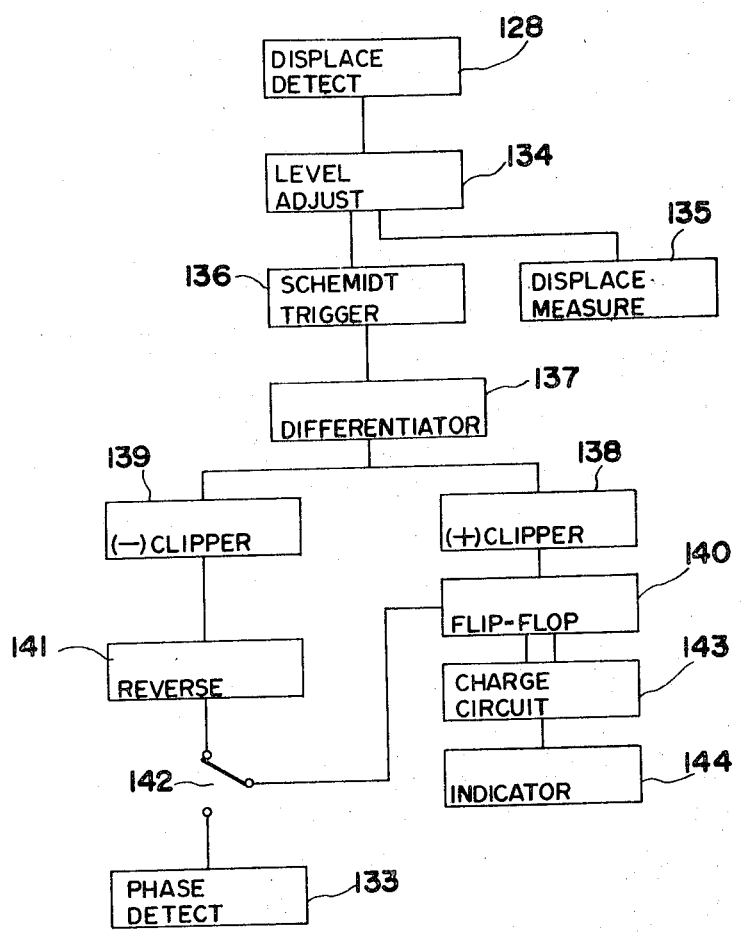
Figure 24:
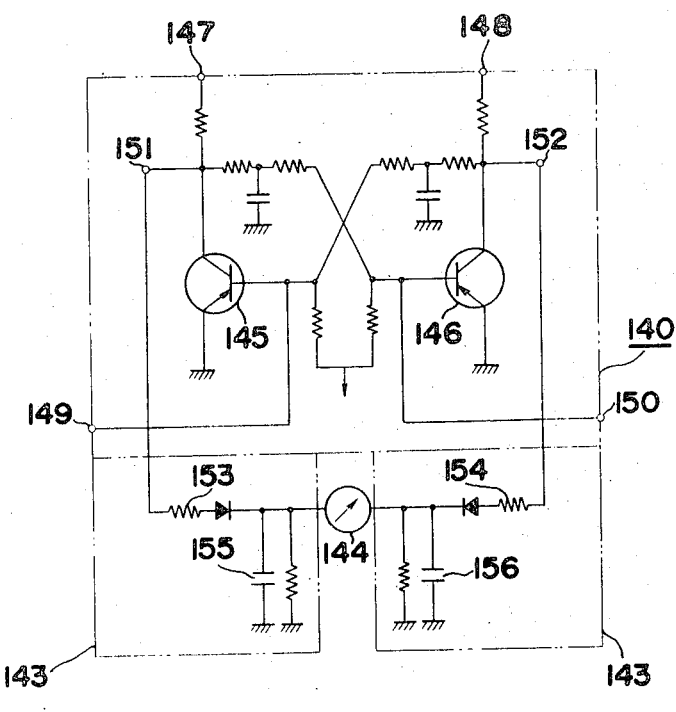

FIGS. 5(a), 5(b), 5(c), 5(d) and 5(e) are views in explanation of the principles of correction of unbalance in a wheel by the off-the-car system;

FIG. 6 is a view in explanation of the essence of principles shown in FIG. 2 in which an error is taken into consideration;

FIG. 7 is a view in explanation of an embodiment for minimizing noise production in carrying out tests;

FIG. 8 is a view in explanation of another embodiment for minimizing noise production in carrying out tests;

FIGS. 9(a) and 9(b) show linkages adapted to vary the instantaneous center of vibration of the vibration system;

FIG. 10 is a sectional view of an embodiment for varying the instantaneous center of vibration of the vibration system by moving the rotary shaft mounting the wheel;

FIGS. 11(a) and 11(b) are views in explanation of the principles on which the embodiment of FIG. 10 is based;

FIG. 12 is a sectional view of an embodiment for varying the instantaneous center of vibration of the vibration system by shifting the linkages;

FIG. 13 is a sectional view of the linkage taken on the line A—A of FIG. 12;

FIGS. 14(a) and 14(b) are views in explanation of the principles on which the embodiment of FIG. 12 is based;

FIG. 15 is a view in explanation of the control system used for effecting control of a fluid used for detecting and correcting unbalance in a wheel according to this invention;

FIG. 16 is a view in explanation of the detection section for detecting and correcting unbalance in a wheel by using a fluid;

FIG. 17 is a view in explanation of correcting of displacement of the center axis of the rotary shaft;

FIG. 18 is a graph showing the relation between the pressure in the nozzle and the distance between the front end of the nozzle and the vibratory member;

FIG. 19 is a view in explanation of a sampling operation;

FIG. 20 is a view in explanation of the relation between the phase detection board and the wheel;

FIG. 21 is a view in explanation of the operation for detecting the phase of unbalance in a wheel;

FIG. 22 is a view in explanation of the principles on which an embodiment of the electric testing system for detecting and correcting unbalance in a wheel is based;

FIG. 23 is a block diagram of an electric circuit for effecting electric control of detection and correction of unbalance in a wheel;

FIG. 24 is a circuit diagram of electric circuits for essential portions; and

FIGS. 25(a), 25(b), 25(c) and 25(d) show wave forms of pulses produced at various stations.

Before giving a detailed explanation of the invention, I should like to summarize the principles on which it is based.

First, the reason why a wheel can be balanced perfectly by merely attaching correction weights to the two surfaces of the wheel: In FIG. 1(a), a rotary shaft R to which a wheel H to be tested is attached is rotated so that the wheel may vibrate radially of the shaft R about the instantaneous center of vibration D of the vibration system. Let us assume that the wheel H is unbalanced as shown at X. If the wheel H can be balanced by merely attaching a correction weight $F_1$ to one side only thereof, the balancing of the moment of force with respect to the center of vibration D can be expressed by the following formula:

$$X \cdot M - F_1 \cdot L_1 = 0 \qquad (1)$$

Thus, an unbalancing force ($F_1-X$) which is directed perpendicularly to the rotary shaft is exerted on the instantaneous center of vibration D.

Let us assume that the wheel H is balanced again by attaching another correction weight $F_2$ to the other side thereof in order to obtain the value of the unbalancing power ($F_1-X$). Then, the following formula can be obtained like the formula (1):

$$X \cdot M - F_2 \cdot L_2 = 0 \qquad (2)$$

Thus, an unbalancing force ($F_2-X$) is produced at the instantaneous center of vibration D although the wheel H is apparently balanced.

In order that the residual force may be zero both in FIG. 1(a) and 1(b), one has only to change $F_1$ and $F_2$ into $F_3$ and $F_3$ so that the couple acting on the point of unbalance X may be reduced to zero as shown in FIG. 1(c). It will be seen that the wheel H can thus be balanced perfectly.

In FIGS. 1(a), 1(b) and 1(c), the wheel H is assumed to be unbalanced only at one point. If the wheel H is unbalanced at three points as shown in FIG. 1(d), the unbalanced points $X_1$, $X_2$ and $X_3$ can be superposed one over another so that the unbalanced point X can take their place as shown in FIG. 1(e). From this, it will be seen that the wheel H can be balanced by merely attaching correction weights to the two sides thereof.

The essence of the principles on which apparatus for detecting unbalance in a wheel are based will now be explained.

From the foregoing description, it follows that attaching of correction weights to two sides of a wheel corresponds to determining of two unknown quantities X and Y as shown in FIGS. 2(a) and 2(b). Thus, the operation of establishing two formulas containing these unknown two quantities and determining their values in the essence of the principles.

More specifically, the following two formulas can be established by shifting the instantaneous center of vibration in FIG. 2:

$$X(L+l) + Yl = F \qquad (3)$$

$$X(L+\Delta l) + Y\Delta l = E \qquad (4)$$

The unknown quantities X and Y can be determined from these two furmulas, it being understood that the distance between the instantaneous center of vibration D on the one hand and F and E on the other is a unit length.

Figure 3:
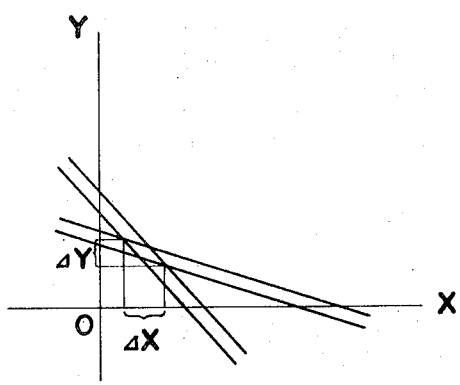
FIG. 3 shows the production of noise in carrying out tests.

Apparatus for detecting unbalance in a wheel are required to have a good signal to noise ratio. The reason for this will now be explained. In order to obtain values of the unknown quantities X and Y from this system of equations 3 and 4, it is effective to shift the instantaneous center of vibration (parameter) and it is necessary that the amount of shifting of the instantaneous center of vibration is sufficiently great. In case the amount of shifting ($l-\Delta l$) of the instantaneous center of vibration is small, variations in the values of E and F determined will manifest themselves directly as noize as shown in FIG. 3, thereby making it impossible to obtain correct values for E and F.

The relation between the speed of revolution of the wheel and the phase of unbalance in the wheel will now be explained. As shown in FIG. 4, when the speed of revolution of the wheel is much lower than the resonance velocity at which the amplitude of vibration is infinite, the vibration produced by any unbalance in the wheel is directed in the same direction as a direction from the center of revolution of the wheel to the position of the unbalance; but when the speed of revolution of the wheel reaches the resonance velocity, the direction in which the vibration is directed is delayed by 90°.

Actually, however, this delay is very sensitive and may vary depending on minor changes in the speed of revolution of the wheel, and if the wheel is rotated at the resonance velocity in testing a wheel for unbalance, difficulty will be experienced in reading the indication of the phase of unbalance because the indication constantly shows a change. On the other hand, if the wheel is rotated at a speed several times as high as the resonance velocity, the vibration will be reduced in magnitude and the direction of vibration will be delayed by 180° with respect to the direction in which the unbalance is positioned. In this case, there is the advantage that the amplitude and phase of vibration are constant and not effected substantially by a change in the speed of revolution of the wheel, with the amplitude being in proportion to the amount of the unbalance. Thus, it is possible to correctly determine the amount of unbalance if amplitude and phase are measured by rotating the wheel at this speed range.

One example of the devices of the off-the-car system for detecting unbalance in a wheel or the device in which unbalance of a wheel is tested twice by mounting the wheel in reversed positions will now be explained. Typical rotational devices of the off-the-car system are classified broadly into devices of the static-dynamic system and those of the two face simultaneous testing system. In the former, dynamic balance is obtained after complete static balance has been obtained. The devices of this system can achieve relatively satisfactory results when the wheel to be tested has a tire of small width and adapted to carry a heavy body and run at low speed, but are unable to correct unbalance in a wheel with high efficiency and accuracy.

If the position of an unbalanced point X is determined by relying on gravitational pull in FIG. 5(a) and if the unbalance is corrected by attaching weights E and E' to opposite sides of the wheel as shown in FIG. 5(b), the result obtained would be considered to be substantially as shown in FIG. 5(c). Then, the wheel is rotated and dynamic unbalance 2W is detected. If the dynamic unbalance 2W were divided into W and W and compensated for by attaching weights to opposite sides of the wheel as shown in FIG. 5(d) by considering that $E \approx X - E'$ and not necessarily $E = X - E'$, the formula of correction would be as follows:

$$[El_1 - (X - E') l_2]/(l_2 - l_1) = W \quad (5)$$

Figure 1:
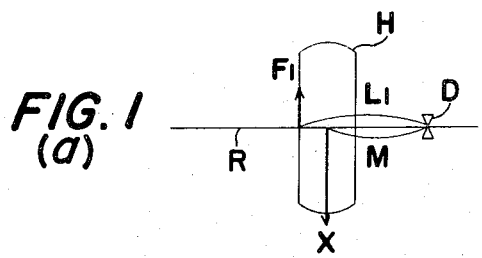
Figure 1:
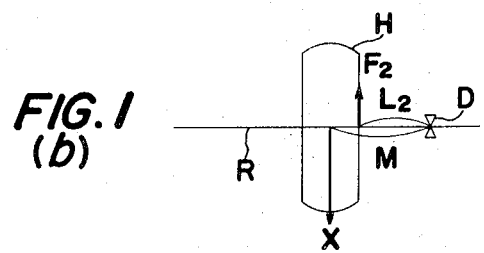
Figure 1:
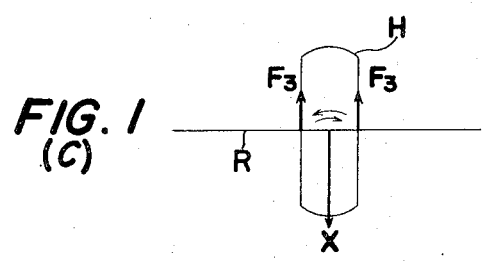
Figure 1:
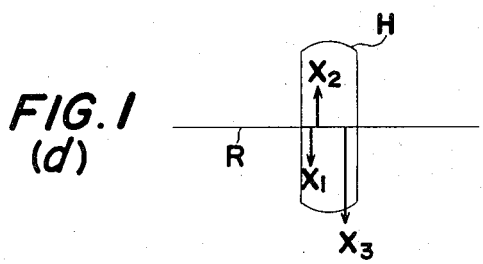
Figure 1:
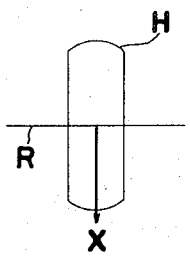

At this point, the problem of the unbalanced power acting on the instantaneous center of vibration D in FIG. 1 must be considered. If the correction weights are attached to the wheel in actual practice, the instantaneous center of vibration of the vibration system should vary because the axial direction of the shaft supporting the king pin coincides with the center of the tread of the tire. Accordingly, if the instantaneous center of vibration is displaced by one half the distance $l_2$ in FIG. 5(e), an error term $\epsilon$ will be produced as shown in the following formula:

$$\frac{El_1 - (X-E')l_2}{l_2 - l_1} - \frac{E\frac{l_2}{2} - (X-E')\frac{l_2}{2}}{l_2 - l_1} = W \quad (6)$$

where $$\frac{E\frac{l_2}{2} - (X-E')\frac{l_2}{2}}{l_2 - l_1} = \epsilon.$$

From the foregoing, it will be seen that it is impossible to obtain perfect static balance due to the friction of the bearing or the like and that the hypothesis $X - E = E'$ is not adequate.

Devices of the two sides simultaneous testing system have been proposed to obviate the disadvantages of devices of the static-dynamic system. These devices are based on the aforementioned essence of principles on which some apparatus for detecting unbalance in a wheel are based.

It is common knowledge that, when the ability of a device to detect signals is low, it is useless to provide the device with expensive means to treat the detected signals. For example, if the propagation of an error in the formulas (3) and (4) described above with reference to FIG. 2 is considered, the result obtained would be substantially as shown in FIG. 6. That is, the values for $E(\Delta l)$ and $F(\Delta l)$ will be as follows from the formulas (3) and (4):

$$\Delta Y = [(L + \Delta l)/L(l-\Delta l)] (\Delta F) + [(L + l)/L(l-\Delta l)] (-\Delta E) \quad (6')$$

$$\Delta X = [\Delta l/L(\Delta l-l)] (\Delta F) + [l/L(\Delta l-l)] (-\Delta E) \quad (7)$$

What is noteworthy in the aforementioned calculation operation is the fact that an error may occur in determining the unknown quantities X and Y, and that an increase in the momentum caused by shifting rearwardly over a great distance of the instantaneous center of vibration may produce noise due to vertical vibration.

In correcting unbalance accurately by means of the aforementioned devices of the static-dynamic system, operations must be repeatedly performed till the final decision is reached. This inevitably causes an increase in the time interval required in testing and effecting correction and the number of correction weights used to attain the end. In using the devices of the two sides simultaneous testing system, it is necessary to decide what means should be used for changing the parameter (the position of the instantaneous center of vibration) while taking into consideration the propagation of an error in the results achieved in testing.

In order that better results may be obtained, two straight lines could be made to cross each other at an angle $\theta$ which is nearly 90° as shown in FIG. 7. The end of causing the two straight lines to cross each other at 90° without relying on the calculation of dual simultaneous equations could be attained by causing the instantaneous center of vibration D of the wheel H to be disposed on side surfaces A and B of the weel H as shown in FIG. 8. When the instantaneous center of vibration D is caused to be set at one side surface A, the following relation can be obtained:

$$\Delta Y = \Delta E/L \quad (8)$$

When the instantaneous center of vibration is set at the other side surface B, the following relation holds:

$$\Delta X = \Delta E/L \quad (9)$$

The errors produced in the results obtained are independent of one another. It will be evident that the device based on these formulas are several times more effective than the device based on the formulas (6) and (7). This can be provided by substituting values in the formulas.

From the foregoing description, it will be evident that improved results can be achieved in compensating for the unbalance in a wheel with high accuracy if the instantaneous center of vibration of the wheel is disposed on opposite rim surfaces of the wheel. The principles based on which this discovery can be put into concrete form will now be explained.

In actual practice, it is difficult to set the instantaneous center of vibration of a wheel at opposite side surfaces thereof. Even if it were possible to provide the instantaneous center of vibration in such positions, difficulty would be experienced in operating the device. It has been discovered that by mounting the wheel by a special arrangement it is possible to have the instantaneous center of vibration of the wheel disposed on one of opposite side surfaces A and B.

In the special arrangement which uses linkages a suitable imaginary circle centered at a position on one rim surface A of the wheel in which the instantaneous center of vibration of the wheel H is desired to be disposed is drawn as shown in FIG. 9(a), and linkages P and P are provided tangentially to the circle. The rotary shaft R is mounted at the center of an arm O connecting the two linkages P and P together. The linkages P and P are disposed such that two lines, each of which is perpendicular to one of the linkages P and P and passes through the center of one of the linkages P and P, cross each other at a point which corresponds to the position in which the instantaneous center of vibration D is desired to be disposed on one of opposite rim surfaces of the wheel H. In causing the instantaneous center of vibration D to be disposed on the other rim surface B, the wheel H may be moved suitably on the rotary shaft R as shown by a single dot-and-dash line in FIG. 9(a) because it is difficult to shift the instantaneous center of vibration D.

Alternatively, the instantaneous center of vibration D can be disposed on opposite rim surfaces of the wheel by arranging the linkages P and P such that extensions of the links cross each other at a point which is disposed on one rim surface A or the other rim surface B of the wheel H as shown in FIG. 9(b). If the linkages P and P are fixed such that their outer ends S and S can be moved away from or toward each other, it will be possible to cause the imaginary instantaneous center of vibration to shift without moving the wheel H.

In the present invention, linkages are employed for moving the instantaneous center of vibration and testing of a wheel for unbalance may be carried out by a purely mechanical method, a method utilizing a fluid or an electrical method.

An embodiment of the present invention in which the instantaneous center of vibration of a wheel is fixed while the wheel can be moved as shown in FIG. 9(a) will now be described.

In the embodiment shown in FIG. 10, a hollow rotary shaft 1 is journalled by two bearings 2 and 3 for rotation while the shaft can vibrate radially of the shaft 1. An outer cylinder 5 of a wheel mounting member 4 is fitted over one end portion of the rotary shaft 1, and longitudinal grooves 6 are formed on the outer peripheral surface of the portion of the rotary shaft 1 on which outer cylinder 5 is mounted so as to receive therein pins 7 projecting inwardly from the inner peripheral surface of the outer cylinder 5 to permit the wheel mounting member 4 to move axially of the rotary shaft 1.

A threaded portion 9 is formed on the inner peripheral surface of an inner cylinder 8 of the wheel mounting member 4 and adapted to threadably engage a threaded portion 11 formed on the outer peripheral surface of one end portion of a moving shaft 10 rotatably fitted in the hollow rotary shaft 1.

A flange 13 is provided on the outer peripheral surface of the outer cylinder 5 for supporting a wheel 12 which is tested for unbalance and adjusted so that it may be perfectly balanced.

Linkages for supporting the wheel 12 such that the instantaneous center of vibration D is disposed on one rim surface of the wheel 12 will now be described. Support plates $14_1$ and $14_2$ of the same shape are secured to opposite sides of the bearing 3 to pivotally support support members $15_1$ and $15_2$ of the same length at the front end thereof at pivots $16_1$ and $16_2$ respectively. The support member $15_1$ pivotally supports one end of support members $17_1$ and $18_1$ at pivots $19_1$ and $20_1$ respectively which are disposed at opposite ends of support member $15_1$, and the support member $15_2$ pivotally support one end of support members $17_2$ and $18_2$ at pivots $19_2$ and $20_2$ respectively which are disposed at opposite ends of support member $15_2$. The support members $17_1$, $18_1$ and $17_2$, $18_2$ which are all of the same length are pivotally connected at the other end thereof to fixed machine frames $21_1$ and $21_2$ respectively.

The link motion is disposed such that a line $22_1$ extending through pivot $16_1$ and disposed perpendicular to the line connecting two pivots $19_1$ and $20_1$ and a line $22_2$ extending through pivot $16_2$ and disposed perpendicular to the line connecting two pivots $19_2$ and $20_2$ cross each other at a point which is disposed in the central portion of the rotary shaft 1. This point of intersection corresponds to the instantaneous center of vibration D.

A first sleeve 23 is fitted over a portion of the rotary shaft 1 which is disposed between the bearings 2 and 3, and a second sleeve 24 is fitted over the outer periphery of the first sleeve 23. A gently sloped spiral groove 25 is formed on the inner peripheral surface of the first sleeve 23 for receiving therein a pin 26 projecting from the rotary shaft 1.

Counterweight means 27 includes weights $29_1$ and $29_2$ secured to opposite ends of support arms $28_1$ and $28_2$ respectively. A support rod 30 provided midway between the support arms $28_1$ and $28_2$ has a lower end which is inserted in the second sleeve 24 and first sleeve 23. 31 is a support frame for the support rod 30.

By this arrangement, when the first sleeve 23 is angularly rotated, the support rod 30 tilts while its tilting is regulated by the support frame 31, and the counterweight means 27 also tilts together with the support rod 30. When the second sleeve 24 is angularly rotated, the counterweight means 27 rotates in the same direction as the rotary shaft 1 or in a direction opposite thereto.

A V-pulley 32 is mounted on the rotary shaft 1 near the other end thereof adjacent the bearing 2 and connected to a motor (not shown). Means is provided at one end of the rotary shaft 1 adjacent the V-pulley 32 for reciprocating the wheel mounting member 4.

More specifically, a hollow cylindrical frame 33 having a pair of bevel gears 34 and 35 opposed to each other and arranged so that their axes are normal to the axis of the rotary shaft 1 is secured to the end of the rotary shaft adjacent the V-pulley 32. Another bevel gear 36 adapted to mesh with the pair of bevel gears 34 and 35 is mounted at the other end of the movable shaft 10. A pair of wheels 37 and 38 are secured to one end of shafts which supports the bevel gears 34 and 35 at the other end thereof, with the wheels 37 and 38 being disposed outside the cylindrical frame 33 and enclosed by a reversing cylinder 39. A square opening is formed in the central portion of a front end of the cylindrical frame 33 for receiving therein a square bar 41 supporting at its inner end a bevel gear 42 adapted to mesh with the pair of bevel gears 34 and 35. A spiral spring 43 is mounted on the square bar 41 between the bevel gear 42 and the inner surface of cylindrical frame 33 so as to normally urge by its biasing force the bevel gear 42 inwardly into meshing engagement with the bevel gears 34 and 35. A knob 44 serving as a stopper is secured to the outer end of the square bar 41.

The operation of the embodiment of the present invention shown in FIG. 10 will now be described. The wheel 12 to be tested for unbalance and adjusted is secured to the flange 13 of the wheel mounting member 4. If the instantaneous center of vibration D does not happen to be disposed on the outer rim surface of the wheel 12, then the knob 44 is pulled toward the operator to release the bevel gear 42 from meshing engagement with the bevel gears 34 and 35 and the motor is rotated at low speed. Since the bevel gear 36 is in meshing engagement with the bevel gears 34 and 35, the rotary shaft 1 and moving shaft 10 rotate conjointly. If the reversing cylinder 39 is moved manually in sliding motion either forwardly or rearwardly at this time, then inner wall surfaces of the reversing cylinder 39 are brought into contact with the wheels 37 and 38 which begin to rotate. Rotation of the wheels 37 and 38 is transmitted through the bevel gears 34, 35 and 36 to the movable shaft 10 which begins to rotate by itself. When the moving shaft 10 rotates in either direction, the wheel mounting member 4 moves either forwardly or rearwardly because the threaded portion 11 of the moving shaft 10 is maintained in threadable engagement with the threaded portion 9 of the wheel mounting member 4. After the instantaneous center of vibration D is placed in the same plane as the outer rim surface of the wheel 12 by moving the wheel mounting member 4 either forwardly or rearwardly as aforementioned, the knob 44 is turned through 90° so that the knob 44 is received in a groove (not shown) formed in the cylindrical frame 33 and the bevel gear 42 is brought into meshing engagement with the bevel gears 34 and 35 by the biasing force of the spring 43. This connects the rotary shaft 1 to the moving shaft 10 so that they act as a unit and axial movement of the wheel mounting member 4 is precluded.

After the wheel 12 is placed in a position in which the instantaneous center of vibration D is disposed on the outer side surface of the wheel 12, the rotation shaft 1 is rotated at a suitable rate which may be several times as high as the resonance velocity described with reference to FIG. 4. If there is unbalance in the wheel 12, then the rotational shaft 1 moves in vibratory motion radially thereof about the instantaneous center of vibration D. In order to remove this vibration, the position of the first sleeve 23 is adjusted axially to cause the counterweight means 27 to tilt, and the position of the second sleeve 24 is also adjusted axially to cause the counterweight means 27 to rotate while the rotary shaft 1 is rotating. The rotation of the motor is stopped when the vibration of the rotary shaft 1 is minimized.

Assuming that the counterweight means 27 tilts as shown in FIG. 11(a) at this time, the moment of force acting on the instantaneous center of vibration D can be given by the following formula:

$$LY + (L + l - l_1) F - (L + l + l_1) F = 0$$
$$LY = 2l_1 F \therefore Y = 2l_1 F/L$$

(10)

Thus, the formula (10) is the same as the formula (8).

Then, the wheel 12 is moved to a single dot-and-dash line position in FIG. 10 in the same manner as aforementioned. The rotary shaft 1 will vibrate when it is rotated with the wheel 12 being disposed in the single dot-and-dash line position, if the wheel 12 is unbalanced. To remove the vibration, the positions of the first and second sleeves 23 and 24 are adjusted as aforementioned.

Assuming that the counterweight means 27 tilts as shown in FIG. 11(b), the moment of force acting on the instantaneous center of vibration D can be given by the following formula:

$$LX + (l - l_2) F - (l + l_2) F = 0$$
$$LX - 2l_2 F = 0 \therefore X = 2l_2 F/L$$

(11)

In the formulas (10) and (11), the values for $L$, $l_1$, $l_2$ and F can be obtained from the conditions under which the wheel 12 is balanced, so that the values of X and Y obtained from the formulas (10) and (11) can be used as the weights of the correction weights. The phase of unbalance can be determined from the position of the counterweight means 27.

When the wheel 12 is perfectly balanced, the force caused to act on the instantaneous center of vibration D by centrifugal forces becomes zero, so that the unbalancing force acting on the instantaneous center of vibration can be removed as described with reference to FIGS. 1(a) and 1(b) no matter in what position the wheel is supported.

An embodiment of the invention in which the instantaneous center of vibration is moved while the wheel to be adjusted is fixed will now be described. In FIG. 12 and FIG. 13, the rotary shaft 1 is rotationally journalled by the bearings 2 and 3 and capable of vibrating radially of the shaft 1. The wheel mounting member 4 having the flange 13 is secured to one end portion of the rotary shaft 1, with the wheel 12 being mounted as by screws on the flange 13.

The first sleeve 23 is fitted over substantially the central portion of the rotary shaft 1, and the second sleeve 24 is fitted over the outer periphery of the first sleeve 23. The gently sloped spiral groove 25 is formed on the inner surface of the first sleeve 23 to receive therein the pin 26 projecting from the rotary shaft 1.

The counterweight means 27 comprises two weights $29_1$ and $29_2$ of the same weight secured to opposite ends of the support arms $28_1$ and $28_2$ respectively. The support rod 30 fitted between the support arms $28_1$ and $28_2$ has a lower end portion which is inserted in the second sleeve 24 and the first sleeve 23. The support rod 30 is supported by the support frame 31 fitted over the rotary shaft 1.

The two support plates $14_1$ and $14_2$ are secured to opposite sides of the bearing 3. Formed integrally on one surface of the support plate $14_1$ is a substantially U-shaped body $45_1$ which mounts at opposite sides thereof shafts $46_1$ and $47_1$ projecting outwardly from the sides. A connecting plate $48_1$ of the H-shape in cross-section includes upper and lower plate members $49_1$ and $50_1$ which are disposed at one end of the plate $48_1$ to engage the rotary shafts $46_1$ and $47_1$ respectively. The connecting plate $48_1$ also includes upper and lower members $51_1$ and $52_1$ which are disposed at the other end of the plate $48_1$ to engage shafts $54_1$ and $55_1$ supported by a substantially U-shaped body $53_1$ substantially similar to the body $45_1$.

A plate member $56_1$ is attached integrally to open end of the body $53_1$, and horizontal plates $57_1$ and $58_1$ provided above and below the front end of the plate member $56_1$ enclose the upper and lower plates $49_1$ and $50_1$. Projections $59_1$ and $60_1$ are formed integrally with the horizontal plates $57_1$ and $58_1$ respectively to be disposed on the outer side in line with the axes of the shafts $46_1$ and $47_1$. The projections $59_1$ and $60_1$ are received in openings $62_1$ and $63_1$ respectively which are formed in fixing plates 61 securely attached to a machine frame (not shown).

The lower projection $60_1$ and fixing plate 61 are formed with a recess $64_1$ and a plurality of openings $65_1$ therein respectively, with a pin $66_1$ being fitted through one of the openings $65_1$ into the recess $64_1$.

A structure identical with the aforementioned structure mounted on the support plate $14_1$ is mounted on the support plate $14_2$. An extension $22_1$ of the line connecting the shafts $46_1$ and $54_1$ together and an extension $22_2$ of the line connecting the shaft $54_2$ and the shaft corresponding to the shaft $46_1$ together cross each other at a point which corresponds to the instantaneous center of vibration. A V-pulley 67 adapted to be rotated from an electric motor (not shown) is secured to a front end of the rotary shaft 1.

The operation of the embodiment shown in FIG. 12 and FIG. 13 will now be described. In causing the instantaneous center of vibration D to be placed on the rotary shaft 1, the pins $66_1$ securing the projections $60_1$ to the fixing plates 61 are withdrawn, and the support plates $48_1$ and $48_2$ are pivoted so as to cause the intersection of the extensions $22_1$ and $22_2$ to be disposed on the intersection of one rim surface of the wheel 12 and the rotary shaft 1. Then, the pins $66_1$ are each inserted in the proper opening $65_1$ so as to secure the projections $60_1$ to the fixing plates 61.

Thus, the fixing plates 61 are secured integrally to the plate members $56_1$ and $56_2$ so that the bodies $53_1$ and $53_2$ are secured to the fixing plates 61. The bodies $53_1$ and $53_2$ are connected to the rotary shaft 1 through the connecting plates $48_1$ and $48_2$ engaged by the bodies $53_1$ and $53_2$ respectively, the bodies $45_1$ and $45_2$ engaged by the connecting plates $48_1$ and $48_2$ respectively, and the support plates $14_1$ and $14_2$ which are integral with the bodies $45_1$ and $45_2$ respectively. Accordingly, the rotary shaft 1 is capable of vibrating radially of the shaft 1 about the instantaneous center of vibration D.

The instantaneous center of vibration D can be set at the other side surface of the wheel 12 in the same manner as aforementioned.

When the rotary shaft 1 is rotated after the instantaneous center of vibration D is set at one side surface of the wheel 12, the shaft 1 rotates together with the wheel 12 and counterweight means 27. If the wheel 12 is unbalanced, then the rotary shaft 1 vibrates radially thereof about the instantaneous center of vibration D because the shafts $54_1$ and $54_2$ are fixed. In order to detect the phase of unbalance, the counterweight means 27 is rotated in the same direction as the rotary shaft 1 or in a direction opposite thereto in which the vibration can be reduced. At the same time, the counterweight means 27 is caused to tilt axially with respect to the rotary shaft 1 so as to determine the amount of correction.

Assuming that the counterweight means 27 is positioned as shown in FIG. 14(a) when the vibration of the rotary shaft 1 is minimized, the moment of force acting on the instantaneous center of vibration D can be expressed by the following formula:

$$LY + (L + l - l_1) F - (L + l + l_1) F = 0$$
$$\therefore Y = 2l_1 F/L$$

(12)

Thus, the formula (12) is the same as the formula (10). This permits correction weights to be attached to the wheel 12 immediately.

Then, the shafts $54_1$ and $54_2$ are moved outwardly by inserting the pins $66_1$ in different openings $65_1$ so as to place the instantaneous center of vibration D on the other rim surface of the wheel 12 by causing the intersection of the extensions $22_1$ and $22_2$ to be disposed on the intersection of the other rim surface of the wheel 12 and the rotary shaft 1.

If the rotary shaft 1 is rotated after the instantaneous center of vibration D is set at the other surface of the wheel 12, then the shaft 1 rotates together with the wheel 12 and counterweight means 27. If the wheel 12 is unbalanced, then the rotary shaft 1 vibrates radially about the instantaneous center of vibration D. In order to detect the phase of unbalance, the counterweight means 27 is rotated in the same direction as the rotary shaft 1 or in a direction opposite thereto in which the vibration can be reduced. At the same time, the counterweight means 27 is caused to tilt axially with respect of the rotary shaft 1 so as to determine the amount of correction.

Assuming that the counterweight means 27 is positioned as shown in FIG. 14(b) when the vibration of the rotary shaft 1 is minimized, the moment of force acting on the instantaneous center of vibration D can be expressed by the following formula:

$$LX + (l - l_2) F - (l + l_2) F = 0$$
$$\therefore X = 2l_2 F/L$$

(13)

Thus, the formula (13) is the same as the formula (11). This permits correction weights to be attached to the wheel 12 immediately.

FIG. 15 shows one form of the control system used for effecting control of a fluid employed for detecting and correcting unbalance in a wheel according to this invention. In FIG. 15, the elements for placing the instantaneous center of vibration D on one or the other rim surface of the wheel are similar to those shown and described with reference to FIG. 12 and FIG. 13. In these figures, reference character designates similar parts whose explanation is omitted.

As shown, the rotary shaft 1 mounts a displacement detector 68 of the cylindrical shape and a phase detection board 70 of the disk shape formed therein with a phase detection opening 69.

Displacement detection means $71_1$ and $71_2$ are disposed on opposite sides of the displacement detector 68. One displacement detection means $71_1$ comprises a spring-loaded bellowphragm $73_1$ contained in a casing $72_1$, and a displacement detection nozzle $74_1$ disposed at the central portion of the movable end of the bellowphragm $73_1$ for reciprocating motion. The nozzle $74_1$ which is cut off from the casing has a forward end portion which is juxtaposed to the displacement detector 68. A hold element $77_1$ provided with a check valve $75_1$ and a variable throttle $76_1$ communicating with atmosphere is connected to one side of the nozzle $74_1$, and a phase detection nozzle $78_1$ is connected to the other side of the nozzle $74_1$ and positioned in the vicinity of the phase detection opening 69. The output of the phase detection opening 69 is supplied to one control port 113 of the phase detection circuit shown in FIG. 16.

The other displacement detection means $71_2$ is substantially similar in construction to the displacement detection means $71_1$ except for the fact a phase detection nozzle $78_2$ is disposed side by side with the displacement detection nozzle $74_2$. The phase detection nozzle $78_2$ is connected to one output port 80 of a back pressure switching element 79 whose the other output port 81 is connected to the other control port 114 of the phase detection circuit shown in FIG. 16.

The output port of the hold element $77_1$ of one displacement detection means $71_1$ is connected to comparator means $82_1$ for comparing the pressure detected with the pressure for which the apparatus is set. The output port of the comparator means $82_1$ is communicated in the casing $72_1$ of the phase detection means $71_1$ through a hydraulic pressure dash pot $83_1$ and to differential pressure detector means 84.

Likewise, the hold element $77_2$ of the other displacement detection means $71_2$ is communicated in the casing $72_2$ of the other displacement detection means $71_2$ through comparator means $82_2$ and a dash pot $83_2$ and to the differential pressure detector means 84.

The comparator means $82_1$ comprises three diaphragms $86_1$, $88_1$ and $90_1$ of the major diameter and two diaphragms $87_1$ and $89_1$ of the minor diameter mounted on a shaft $85_1$ in a cylindrical casing. The diaphragms of the major diameter and minor diameter are disposed alternately and spaced apart from one another to define first, second, third, fourth and fifth chambers $91_1$, $92_1$, $93_1$, $94_1$ and $95_1$, the first chamber $91_1$ being connected to the hold element $77_1$, the second chamber $92_1$ being adapted to receive therein a fluid under a predetermined pressure $P_1$, the third and fourth chambers $93_1$ and $94_1$ communicating with atmosphere, and the fifth chamber $95_1$ having in its central portion a nozzle $96_1$ communicating with atmosphere and being adapted to receive a fluid through a port formed at one side thereof and having an output port at the other side thereof for communication with the dash pot $83_1$. The other comparator means $82_2$ is constructed identically with the comparator means $82_1$.

The differential pressure detector means 84 comprises four diaphragms of the major diameter 97, 99, 101 and 102 and two diaphragms of the minor diameter 98 and 100 mounted on a shaft 103 in a cylindrical casing. The diaphragms of the major diameter and minor diameter are disposed alternately and spaced apart from one another to define first, second, third, fourth, fifth and sixth chambers 104, 105, 106, 107, 108 and 109, the first chamber 104 being adapted to receive therein a fluid under another predetermined pressure $P_3$, the second and fourth chambers 105 and 107 being connected to the dash pots $83_1$ and $83_2$ respectively, the third and fifth chambers 106 and 108 communicating with atmosphere, and the sixth chamber 109 having in its central portion a nozzle 110 communicating with atmosphere and being adapted to receive a fluid through a port formed at one side thereof and having a manometer 111 mounted at a port formed at the other side thereof.

The phase detector circuit shown in FIG. 16 will be described. 112 is a pure fluid bistable element adapted to be attached to a wall which is formed with two control ports 113 and 114 which receive a fluid from the phase detection port 69 as a set signal and a fluid from the output port 81 of the switching element 79 as a reset signal. The element 112 is also formed with output ports 115 and 116 which are connected to control ports 122 and 123 respectively of a proportional element 121 through throttles 117, 118 and charge tanks 119, 120 respectively. Manometers 126 and 127 for phase detection are mounted in output ports 124 and 125 of the proportional element 121.

The operation of the control system shown in FIG. 15 and the phase detector circuit shown in FIG. 16 will now be described. The wheel 12 is mounted on the rotary shaft for detecting if the wheel has unbalance. Then, the instantaneous center of vibration D is placed on a point at which one rim surface of the wheel 12 crosses the rotary shaft 1. If the rotary shaft 1 is rotated by a motor, the rotary shaft 1 will vibrate radially thereof about the instantaneous center of vibration D when the wheel 12 is unbalanced, and the displacement detector 68 will also vibrate.

When a fluid of a uniform pressure P is introduced into the nozzles $74_1$, $74_2$, $78_1$ and $78_2$, the fluid is ejected through these nozzles. The pressure P in the nozzle $74_1$ and the distance $\delta l$ between the nozzle $74_1$ and the displacement detector 68 has characteristics shown in FIG. 18, with the pressure in the nozzle $74_1$ being maintained by the hold member $77_1$. That is, if the pressure in the nozzle $74_1$ has characteristics shown by a curve $a$ in FIG. 19, the pressure in the hold element $77_1$ has characteristics shown by a curve $b$ in FIG. 19. It is because the fluid in the element $77_1$ is partly vented to atmosphere by the throttle $76_1$ that the curve $b$ has negative inclination characteristics. It will thus be evident that if the throttle $76_1$ is variable the angle of the negative inclination can be varied as desired.

The output of hold element $77_1$ is supplied to the first chamber $91_1$ of comparator means $82_1$ and compared with the fluid under the predetermined pressure $P_1$. When the pressure of fluid in the first chamber $91_1$ is higher, all the diaphragms move in a direction where they move away from the nozzle $96_1$, so that the fluid introduced into the fifth chamber $95_1$ is vented to atmosphere through the nozzle $96_1$ and the output is not fed back to the displacement detection means $71_1$ through the dash pot $83_1$.

When the pressure of fluid in the first chamber $91_1$ is lower than the pressure of fluid in the second chamber $92_1$, all the diaphragms move in a direction where they move toward the nozzle $96_1$ and the pressure in the fifth chamber $95_1$, increases, so that an output proportional to the increase is fed back to the displacement detection means $71_1$ through the dash pot $83_1$. This causes the movable end of the bellow-phragm $73_1$ to move toward the displacement detector 68. Thus, the distance $\delta l$ between the displacement detector 68 and the nozzle $74_1$ is maintained uniform, From this, it will be evident that when the amplitude of the displacement detector 68 is high, the nozzle $74_1$ moves rearwardly and that when the amplitude of the displacement detector 69 is low, the nozzle $74_1$ moves forwardly. Since the amplitude varies depending on the amount of unbalance in the wheel 12, it is possible to determine the amount of unbalance in the wheel 12 by detecting the amount of forward or rearward movement of the nozzle $74_1$.

The amount of unbalance in the wheel 12 with respect to the instantaneous center of vibration D on the other rim surface of the wheel can be determined in like manner.

Now, the description refers to the detection of the phase of unbalance or determining in what portion of the wheel the unbalance is present. Let us assume that the wheel 12 is unbalanced at A in FIG. 20, and that the phase detection opening 69 of the phase detection board 70 is disposed in a position which is advanced by an angle $\alpha$ with respect to the position of unbalance A.

If the switching element 79 is set such that it is disconnected from an output port 80 and connected to an output port 81 when the amplitude of the displacement detector 68 has characteristics shown by a curve c in FIG. 21 and the displacement detector 68 moves nearest to the nozzle $78_2$, then a pulse signal in synchronism with the frequency amplitude of the displacement detector 68 is supplied through the output port 81 to the control port 114 of the bistable element 112. An output of element 112 is passed through the throttle 118 and stored in the charge tank 120.

On the other hand, an output in pulse signal form is supplied to the control port 113 of the bistable element 112 each time the phase detection opening 69 is indexed with the nozzle $78_1$, and the element 112 is disconnected from the output port 116 and connected to the output port 115, so that an output of the element 112 is stored in the charge tank 119 through the throttle 117.

The amount of fluid stored in the charge tank 119 corresponds to portions X in FIG. 21 while the amount of fluid stored in the charge tank 120 corresponds to portions Y in FIG. 21. The proportional element 121 produces at its output ports 124 and 125 outputs which are proportional to the amounts of fluid stored in the charge tanks 119 and 120, and differences in phase are expressed as differences in pressure by the manometers 126 and 127. Thus, the amount of unbalance in the wheel 12 determined by the amount of forward or rearward movement of the nozzle $74_1$ can be compensated for by attaching a correction weight to a portion of the wheel 12 shown at B in FIG. 20 which is diametrically opposed to A. This is supported by the statement made previously with reference to FIG. 4.

Compensation for a displacement involving the shifting of the center line of the rotary shaft 1 by a distance $\delta r$ from $R_1$ to $R_2$ in FIG. 17 when the wheel 12 is replaced by another wheel or when the instantaneous center of vibration D is set will be explained. Assuming that the distance between the displacement detector 68 and the nozzles $74_1$ and $74_2$ is K when the former remains stationary in its normal position and that the distances between the displacement detector 68 and the nozzles $74_1$ and $74_2$ are $k_1$ and $k_2$ respectively when the former vibrates and draws nearest to the latter after being displaced from its normal position, the relation between the amplitude $h_1$ in the normal position and the amplitude $h_2$ in the displaced position and the distances K, $k_1$ and $k_2$ can be expressed by the following formula:

$$h_1 = h_2 = (K - k_1) + (K - k_2) \tag{14}$$

Since the second and fourth chambers 105 and 107 of the differential pressure detector means 84 are connected to the first and second displacement detection members $71_1$ and $71_2$ respectively, pressures which may vary depending on the distances $k_1$ and $k_2$ are introduced into the second and fourth chambers 105 and 107. A fluid under the pressure $P_3$ for which the apparatus is set is introduced into the first chamber 104 of the differential pressure detector means 84.

Since the diaphragms 99 and 101 of the second and fourth chambers 105 and 107 on the side of the nozzle 110 have a major diameter and the diaphragm 97 of the first chamber 104 on the opposite side of the nozzle 110 has a major diameter, the shaft 103 moves toward the nozzle 110 when the sum of the pressures in the second and fourth chambers 105 and 107 is greater than the pressure in the first chamber 104, with a result that the pressure in the sixth chamber 109 increases. The increased pressure in the sixth chamber 109 which can be read out on the manometer 111 represents the distance $\delta r$ of displacement of the center line of the rotary shaft 1. The positions of the nozzles $74_1$ and $74_2$ at which the amount of unbalance in the wheel 12 has been determined can be corrected in accordance with the value read out on the manometer 111.

An embodiment of the electric testing system for detecting and correcting unbalance in the wheel will be explained. In FIG. 22, the instantaneous center of vibration D is set in the same manner as described with reference to FIG. 12 and FIG. 13. Displacement detection means 128 comprising a differential transformer or the like and adapted to convert the vibration of the rotary shaft 1 into an electric signal is disposed in close proximity to substantially the central portion of the shaft 1. A phase detection means 133 comprising a disk 130 secured to the shaft 1 and formed therein with a cutout 129, a lamp 131 and a phototransistor 132 is provided. In FIG. 23, the displacement detection means 128 is connected to signal level adjusting means 134 comprising a variable resistor or the like which in turn is connected displacement measuring means 135 and a Schmidt trigger circuit 136. The Schmidt trigger circuit 136 is connected to a differentiation circuit 137 which is in turn connected to a positive clipper 138 and a negative clipper 139, the positive clipper being connected to a set signal input terminal of a flip-flop circuit 140 and the negative clipper 139 being connected to a reset signal input terminal of the flip-flop circuit 140 through a reversing circuit 141 and one contact of a change-over switch 142. The other contact of the change-over switch 142 is connected to the phase detection means 133. The output terminals of the flip-flop circuit 140 are connected to an indicator 144 through charging circuits 143.

The flip-flop circuit 140, charging circuits 143 and indicator 144 are shown in concrete form in FIG. 24. The flip-flop circuit 140 comprises two transistors 145 and 146. 147 and 148 are terminals for connection to a power source, 149 and 150 are set and reset signal input terminals respectively, and 151 and 152 are output terminals which are connected to the indicator 144 as well as the charging circuits 143, one comprising a resistor 153 and a capacitor 155 and the other comprising a resistor 154 and a capacitor 156.

The operation of the aforementioned electric testing system will be explained. The wheel 12 is mounted on the rotary shaft 1 to have its unbalance corrected. Then, the instantaneous center of vibration D is set on one rim surface of the wheel 12. When the rotary shaft 1 is rotated, thewheel 12 also rotates. The rotary shaft 1 will the wheel radially thereof if the wheel 12 is unbalanced. The vibration should have an amplitude which is symmetrical with respect to a reference axis $R_1$ as shown by a characteristic curve A in FIG. 25(a). It often happens that the center axis of the rotary shaft 1 does not coincide with the reference axis $R_1$ for various reasons, and the rotary shaft 1 may be displaced as shown by an axis $R_2$. This displacement of the axis is detected by the displacement detection means 128 whose output is converted into a rectangular wave form as indicated at B in FIG. 25(a) and further differentiated as shown in FIG. 25(b) by the differentiation circuit 137.

Figure 25:
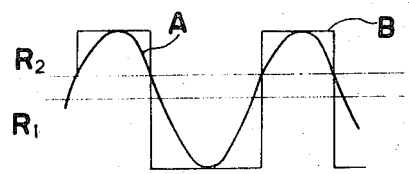
Figure 25:
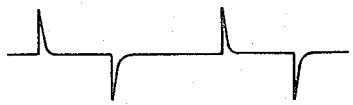
Figure 25:
Figure 25:
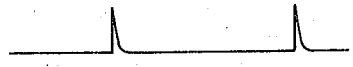

The differentiated output is supplied through the positive clipper 138 to the set signal input terminal 149 of the flip-flop circuit 140 in the form of a signal shown in FIG. 25(c). At the same time, the differentiated output is passed through the negative clipper 139, reversed by the reversing circuit 141 and supplied to the reset signal input terminal 150 of the flip-flop circuit 140 in the form of a signal shown in FIG. 25(d).

Two outputs of the flip-flop circuit 140 charge the respective charging circuits 143, and a current representing the output whose charging is finished earlier than the other output flows to the indicator 144 to cause the pointer to deflect in one direction. Assuming that the time elapsing after the set signal is received till the reset signal is received is longer than the time elapsing after the reset signal is received till the set signal is received, the charging circuit 143 connected to the reset output terminal 150 finishes charging earlier than the other charging circuit 143, so that the indicator 144 indicates that the output of the reset side is larger than the output of the set side.

Thus, if the signal level is adjusted by the signal level adjusting means 134 such that the set signal and the reset signal are supplied alternately at regular time intervals to the flip-flop circuit 140 till the pointer of the indicator 144 ceases to deflect while the operator watches the indicator, the center axis of the rotary shaft 1 will move from the axis $R_2$ and become aligned with the reference axis $R_1$.

In detecting the phase of unbalance in the wheel 12, the change-over switch 142 is brought into engagement with the phase detector means 133. Then, a signal is supplied from the phase detector means 133 by means of the disk 130, lamp 131 and phototransistor 132 to the reset input terminal 150 of the flip-flop circuit 140. On the other hand, a set signal is supplied to the set signal input terminal 149 of the flip-flop circuit 140. The set signal is compared with the reset signal and the result is indicated by the indicator 144 as a difference in phase.

Then, the rotary shaft 1 is made to stop rotating, and a correction weight corresponding to the value determined by the displacement measuring means 135 is attached, in a position indicated by the indicator 144, to a surface of the wheel 12 opposite to the surface on which the instantaneous center of vibration D has been set.

Now, the instantaneous center of vibration D is set on the other rim surface of the wheel 12. The amount of unbalance in the wheel and the phase of unbalance in the wheel 12 are detected in the same manner as aforementioned. A correction weight is attached, in a position indicated by the indicator 144, to a surface of the wheel 12 opposite to the surface on which the instantaneous center of vibration D has been set.

What is claimed is:

1. An apparatus for detecting unbalance in a wheel, comprising: a rotary shaft for rotation by drive means, a wheel mounting member axially movable disposed on said rotary shaft for mounting thereon a wheel to be balanced, a bearing mounted midway between opposite ends of said rotary shaft for rotation about the axis of the rotary shaft while axially fixed with respect to said shaft, a plurality of arms each fixed to and extending from said bearing for regulating said rotary shaft such that said shaft may vibrate in one plane only, a plurality of linkages each pivotally connected at one end to one of said plurality of arms and at the other end to a machine frame, said plurality of linkages disposed at an angle to each other such that imaginary lines each passing through the two pivot ends of each one of the plurality of linkages intersect each other at a point on said rotary shaft for setting the instantaneous center of vibration of the vibration system at one point and means for detecting the amplitudes of vibration of the rotary shaft when the wheel and wheel mounting member are at at least two different axial locations with respect to said shaft.

2. The apparatus of claim 1 including means for setting the instantaneous center of vibration at a first counter weight mounting surface of said wheel to be balanced wherein said imaginary lines each pass through the center and the pivot of one of the plurality of linkages to intersect each other at one point on the rotary shaft which coincides with a point at which said first counter weight mounting surface at one side of said wheel to be balanced and said rotary shaft intersect each other, and for setting the instantaneous center of vibration at a second counter weight mounting surface of said wheel to be balanced by moving said wheel mounting member, wherein the magnitude of unbalance of the wheel can be detected from the amplitudes of the rotary shaft each determined when the instantaneous center of vibration is set at one of said two surfaces.

3. An apparatus for detecting unbalance in a wheel, comprising: a rotary shaft for rotation by drive means and having attached thereto a wheel mounting member for removably mounting thereon a wheel to be balanced, a bearing mounted midway between opposite ends of said rotary shaft for rotation about the axis of the rotary shaft while axially fixed with respect to said shaft, a plurality of arms each attached to and extending from said bearing for regulating said rotary shaft such that said shaft may vibrate in one plane only, a plurality of linkages each pivotally connected at one end to one of said plurality of amrs and at the other end to a machine frame with said other end of each linkage pivotally connected to the machine frame by means adapted for shifting the position of pivotal connnection on said linkage, said plurality of linkages disposed at an angle to each other such that imaginary lines each passing through the two pivot ends of one of the plurality of linkages intersect each other at one point on said rotary shaft for setting the instantaneous center of vibration of the rotary shaft at one point, so that said pivot ends at which said plurality of linkages are pivotally connected to the machine frame may be shifted for setting the instantaneous center of vibration of the rotary shaft at another point on the rotary shaft, and means for detecting the magnitude of unbalance of the wheel from the amplitudes of the rotary shaft when the instantaneous center of vibration is set at each of said two points.

4. The apparatus of claim 3 wherein a plurality of counter weights are connected for rotation with the rotary shaft as a unit, each of said plurality of counter weights being of the same weight and each being mounted at the forward end of one of a plurality of arms extending midway from the rotary shaft in opposite directions, said plurality of arms supporting said plurality of counter weights capable of being tilted axially of the rotary shaft and rotatably about the axis thereof.

5. The apparatus of claim 3 in which said detecting means includes a first displacement detection means disposed on one side of said rotary shaft and including a nozzle filled with a fluid maintained at a uniform pressure level and having a nozzle opening oriented in the direction of vibration of the rotary shaft, and a hold element connected to said nozzle and adapted to hold a fluid pressure in said nozzle, which pressure may be varied according to a change of distance between the nozzle and rotary shaft due to the vibration of the rotary shaft, and a comparator means connected to said hold element for comparing the pressure from the hold element with another predetermined fluid pressure level and for feeding back the differential pressure to said nozzle for moving the nozzle a distance proportional to the differential pressure, for detecting magnitude of unbalance from the distance of movement of said nozzle.

6. The apparatus of claim 5 further comprising a phase detection board attached to said rotary shaft and having a phase detection opening therein, a phase detection nozzle disposed such that its nozzle opening faces said phase detection opening and for producing an output each time its nozzle opening is indexed with the phase detection opening, a second phase detection nozzle disposed on one side of said rotary shaft and having a nozzle opening facing the direction of vibration of the rotary shaft, a switching element for producing an output when the rotary shaft moves nearest to said second phase detection nozzle, a bistable element connecting the output of said first phase detection nozzle and the output of said switching element to two control ports, and a plurality of manometers each connected to one of two output ports of said bistable element through one of two charge tanks.

7. The apparatus of claim 5 further comprising a second displacement detection means disposed on the other side of said rotary shaft from said first displacement detection means, and oriented in the direction of vibration of the rotary shaft, a second comparator means connected to said second displacement detection means, a differential pressure detection means for detecting the difference between the pressure representing the sum of the outputs of the two comparator means and the predetermined pressure of the fluid, and a manometer for indicating a displacement of the center axis of said rotary shaft in accordance with an output signal of said differential pressure detection means.

8. The apparatus of claim 3 in which said detecting means includes a displacement detection means disposed on one side of said rotary shaft and oriented in the direction of vibration of the rotary shaft for converting the vibrations of the rotary shaft into electric signals, a signal level adjusting means connected to the output terminal of said displacement detection means for setting a reference axis for said rotary shaft, a displacement measuring means connected to the output terminal of said signal level adjusting means for detecting the magnitude of unbalance from the amplitude of the rotary shaft, a Schmidt trigger circuit connected to said signal level adjusting means for converting its output into a rectangular wave signal, a differentiation circuit connected to said Schmidt trigger circuit for differentiating said rectangular wave signal, a positive clipper connected to said differentiation circuit for producing a positive signal only, a negative clipper connected to said differentiation circuit for producing a negative signal only, a flip-flop circuit connected at one input terminal to said positive clipper and at the other input terminal to said negative clipper through a reversing circuit, and an indicator connected to two output terminals of said flip-flop circuit through charging circuits respectively for comparing the signals from the two output terminals with each other, said signal level adjusting means being adjustable in accordance with a value indicated by said indicator for setting said reference axis for detecting the magnitude of unbalance at said displacement measuring means.

9. The apparatus of claim 8 further comprising a disc having a radial cutout therein, and attached to said rotary shaft, a phase detection means including a lamp and a phototransistor disposed on opposite sides of said disc, and a changeover switch disposed between said reversing circuit and said flip-flop circuit and connected to said phase detection means.

10. An apparatus for detecting unbalance in a wheel, comprising: a rotary shaft for rotation by drive means and having attached thereto a wheel mounting member for removably mounting thereon a wheel to be balanced, a bearing mounted midway between opposite ends of said rotary shaft for rotation about the axis of the rotary shaft while axially fixed with respect to said shaft, a plurality of support plates integral with and extending from said bearing to regulate said rotary shaft such that said shaft vibrates in one plane only, a plurality of connecting plates each pivotally supported at one end by one of said plurality of support plates through a pair of stub shafts, a plurality of plate members each pivotally supported by one of said plurality of connecting plates at the other end thereof through a pair of stub shafts, a fixing plate pivotally supporting said plate members by two pairs of projections each pair disposed at the other end of one of said plurality of plate members and disposed coaxially with said two pairs of stub shafts, and a pair of angle adjusting pins each inserted in one of two connections between said fixing plate and said two pairs of projections for adjusting the angle formed by the fixing plate and the plurality of plate members, for shifting the point at which an imaginary line formed by the first two pairs of stub shafts and an imaginary line formed by the second two pairs of stub shafts intersect each by changing the positions in which said pins are inserted for bringing said intersection of said imaginary lines into coincidence sequentially with one counter weight mounting surface at one side of said wheel to be balanced and then with the other counter weight mounting surface at the other side thereof for setting the instantaneous center of vibration at said two points, and means for detecting the magnitude of unbalance of the wheel to be balanced from the amplitudes of the rotary shaft determined when the instantaneous center of vibration is at each of said two points.

* * * * *